Patented Aug. 7, 1928.

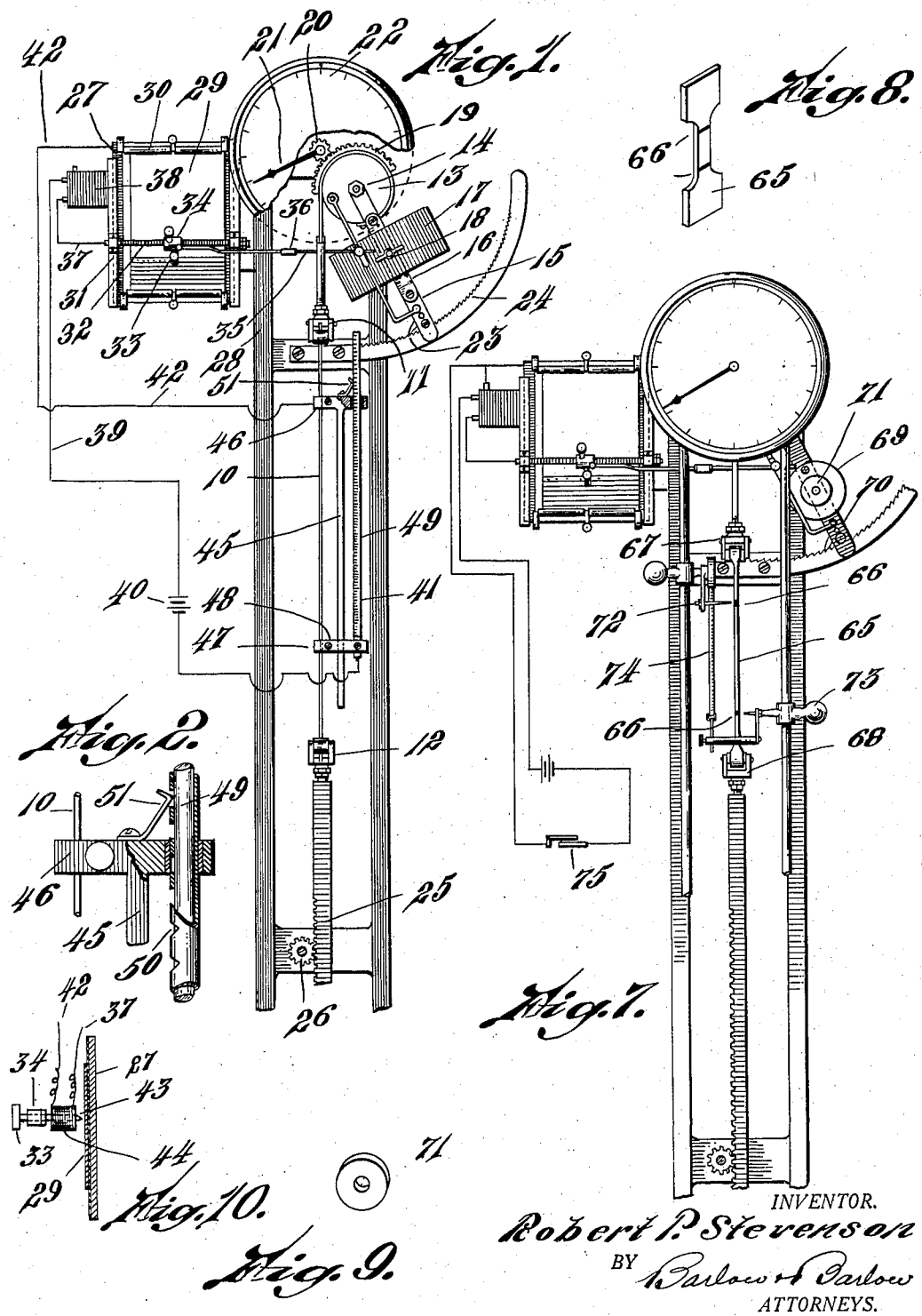

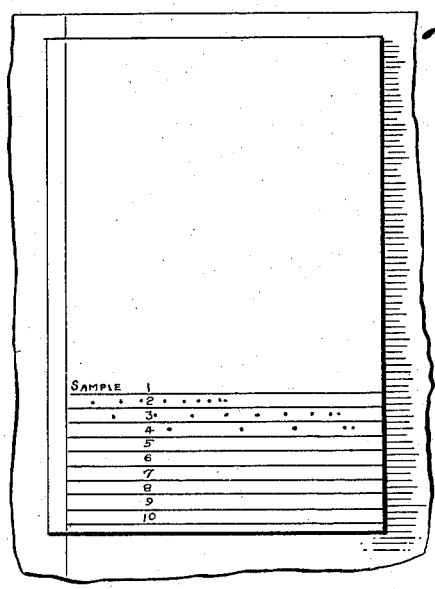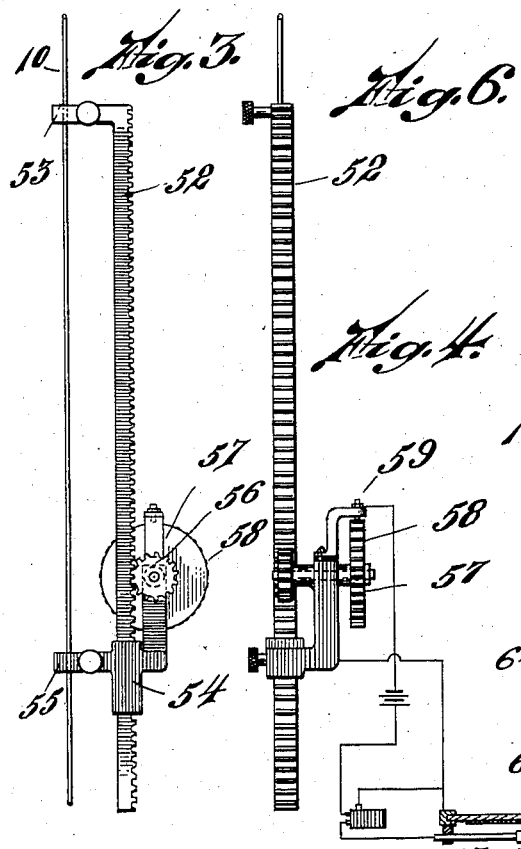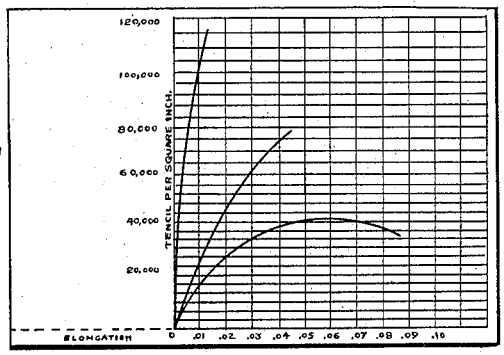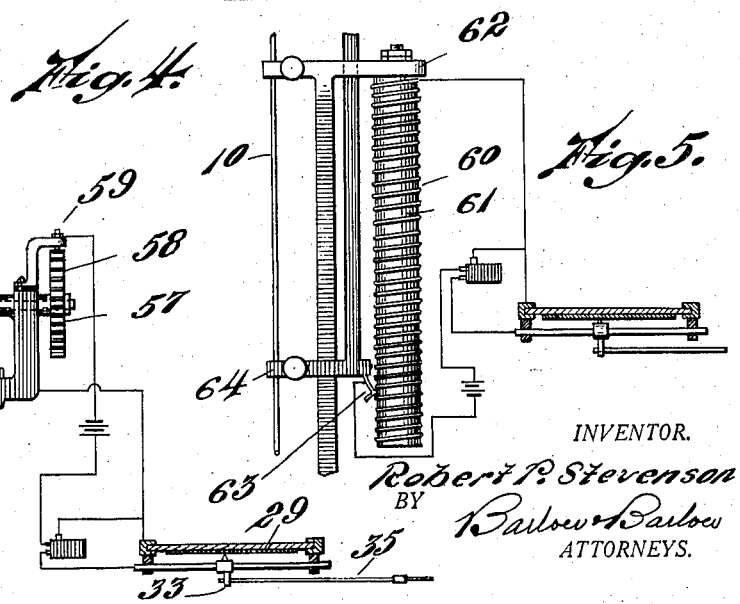

1,679,751

UNITED STATES PATENT OFFICE.

ROBERT P. STEVENSON, OF PROVIDENCE, RHODE ISLAND, ASSIGNOR TO HENRY L. SCOTT COMPANY, OF PROVIDENCE, RHODE ISLAND, A CORPORATION OF RHODE ISLAND.

TESTING MACHINE.

Application filed March 31, 1927. Serial No. 179,879.

This invention relates to an improved machine for testing elongatable material such for instance as rubber, textiles, metals or any material whose length will be extended during a tensile testing operation, and is a continuation in part of my application filed August 9, 1926, Serial Number 128,270. One of the objects of this invention is to provide means for indicating through a chart or record sheet from the back to the front thereof at predetermined intervals as the recording pointer is moved along its rear surface to cause the indications to be applied to the rear side of the chart as the stress strain is applied to the sample being tested whereby the chart when finished may be removed from the machine and these points projected to corresponding percentage lines on its front face and a curve drawn through the plotted points to represent the behavior of the sample elongated without further mathematical calculations.

A further object of the invention is to provide in my improved testing machine means for varying the resistance to the pull on the upper work-gripping jaw to compensate for the varying sizes of specimens from the standard so that the indicating means will read in terms of the standard size test specimen.

With these and other objects in view, the invention consists of certain novel features of construction, as will be more fully described, and particularly pointed out in the appended claims.

In the accompanying drawings:

Figure 1 is a diagrammatic view showing one form or arrangement of mechanism to be attached to the usual tension testing machine by which samples of different dimensions may be tested and the reading on the machine will be as of samples of standard dimensions.

Figure 2 is an enlarged view showing the contact means for indicating the stretch of the material being tested.

Figure 3 is a side elevation showing one means for multiplying the number of electrical contacts to be obtained in a given amount of stretch of the specimens.

Figure 4 is a front elevation of the mechanism shown in Figure 3.

Figure 5 illustrates another form of making extra contacts at each given percentage of stretch of the specimen.

Figure 6 is a chart which shows the ruling on its front face and also shows the indicating points which would be pierced from the back of the chart when positioned on the platen and the curves plotted from these points on the front by projecting these points across the different vertical lines on the face of the chart giving the result of a test of steel wire.

Figure 7 shows a machine particularly adapted for testing rubber specimens.

Figure 8 shows a standard shaped specimen of rubber to be tested.

Figure 9 shows an auxiliary weight to be added to the rubber testing machine.

Figure 10 shows a construction by which a needle may be operated by a solenoid to puncture the chart at each impulse caused by closing the electric circuit.

Figure 11 shows the rear face of the chart as placed with its face outward when the chart is applied to the supporting platen.

Figure 12 is the same as Figure 6 but showing the result of a plurality of tests of rubber samples.

Specimens of some materials to be tested are usually of a given or standard dimension in order to obtain the desired relative results in testing samples of materials of different qualities on the usual testing machine, but if the dimensions of these specimens vary from standard sizes then it is found of great advantage to be able to adjust the machine so as to compensate for such variations whereby the machine is caused to read in terms of the standard size specimen, which adjustment may be obtained in any convenient way, but one preferred arrangement is herein shown which is that of graduating the weight arm and slidably mounting the resistance weight thereon so that by the adjustment of this weight up or down on the arm, the machine is made to vary its resistance to compensate for different dimensions of specimens being tested and so cause the pointer on the dial to read in terms of a standard size unit of test specimen, for example: If wire were being tested of sizes ranging from #6 to #12 the machine could be set so that with the resistance weight at the zero position, it would truthfully record the strength of a specimen of wire, and if moved upward to the proper indication on the lever, it would test a #12 wire and record it in the terms of the #8 wire, or, if the weight were moved downward on the lever to the required point the machine would test the larger size #6 wire and also record this in the terms of the #8 wire.

The standard way of charting a curve to indicate the behavior of the sample being tested is so that it can be read from the left to right on the chart. As one method of producing such a reading on a standard type of testing machine, I have arranged a specially ruled chart which consists essentially of a letter size sheet of paper on the front face of which is laid off a plurality of spaced, intersecting, right-angularly disposed lines.

The axis of abscissas or zero poundage line is a horizontal line at the bottom of the sheet reading in percentage of elongation or stretch of 1% up to 100% as the case may be beginning at zero and the axis of ordinates reading upwardly from zero at the left side is in pounds per square inch. The sheet is provided with an unruled space at the left. The reverse side or rear face of this sheet has a line across one side coinciding with the zero poundage line on the front and the rear face is ruled at right angles to the zero line at a portion coinciding with the unruled portion on the front.

This ruled portion on the rear face is numbered consecutively to designate the different samples tested. One means of obtaining a reading on the front of the sheet is by operating upon the rear thereof. The operator places the chart on a sparking platen connected in the electric circuit and arranged to form one terminal of the spark gap of the machine with the reverse side or rear face outwardly; he then positions the spark point or other terminal of the spark gap on the vertical zero line and starts the machine. At each designated per cent or other unit of measure of elongation or stretch of the sample and at the break the circuit is closed either automatically or by a manually operated switch which causes an electric spark of high tension to pass from the pointer through the paper to the platen behind it. After this has been accomplished and one or more tests have been made, the chart is removed and reversed, and the punctured points are projected to the corresponding vertical percentage lines and the curve plotted, which curve represents pounds per square inch at each given percentage of elongation of the sample being tested. By this method the stress strain is graphically indicated without further mathematical calculations. Instead of employing the jump spark method of transmitting the indications from the back to the front of the card or chart, I may if desired, drive a needle point through the paper which has the advantage of making much smaller holes in the paper than the sparking method, and, therefore, the holes may be placed much closer together which in some cases is required, or any other desired method for accomplishing this purpose of transmitting indications from the back to the front of the chart, may be employed without departing from the spirit and scope of this invention; and the following is a detailed description of the present embodiment of my invention and showing one form of mechanism by which these advantageous results may be accomplished:—

With reference to the drawings, 10 designates a sample of wire being tested which is of the usual shape, one end being engaged by the clamp 11 and its opposite end by the clamp 12. The clamp 11 is suspended from the head 13 which is pivotally mounted on the shaft 14. To this head is connected a depending weight arm 15 graduated at 16 and carrying a weight 17 adjustably mounted thereon to be retained in adjusted position by a set screw 18.

On this shaft 14 is mounted the segment 19 meshing with a pinion 20 to move the pointer 21 over the face of a graduated dial 22 to indicate in pounds or other unit of measure the pull being exerted on the specimen during the testing operation.

The weight arm is provided with a ratchet pawl 23 in engagement with the rack 24 to prevent the arm from at once returning to normal after the sample has been ruptured.

Power is herein shown as being applied to the lower end of the sample through a rack 25 and pinion 26.

In order to record the behavoir of the specimen being tested, an electrical conducting platen 27 is supported on the frame 28 of the machine in the vicinity of the weight arm 15 and on which the chart 29 is supported by the usual clamps 30. The platen is movable vertically in the guides 31. On these guides and insulated therefrom is supported a guide rod 32 on which is slidably mounted a spark pointer 33 and this pointer has a bearing 34 which is connected to the weight 17 through the rod 35 which is insulated therefrom by the member 36.

In order to provide a high tension electric circuit, I have connected a wire 37 to the end of this guide rod 32 which is connected through a coil 38, wire 39 to the battery 40 and automatic making and breaking device 41 back through wire 42 to the platen guide frame 31 whereby this automatic switch is operated to make and break the circuit at intervals and cause the spark to jump from the point 33 through the chart 39 to the platen 27 on which it is supported.

This high tension spark is of sufficient force to puncture the chart so that these points of puncture may be readily discernible on the opposite side or front face of the chart.

I have described the jump spark type of recording device but this recording may be accomplished by many other methods among others being by a piercing operation such for instance as that illustrated in Figure 10, in which a needle 43 is positioned to be operated by impulses of a solenoid 44 at each closing of the circuit to puncture the chart 29, or any other indicating means may be employed for transferring indicating marks from the back to the front of the chart.

In order to close the circuit automatically at each given percentage of stretch of the specimen, I have shown in Figure 1, a rod 45 which is clamped at its upper end at 46 to the specimen 10 at a point intermediate the upper and lower clamping jaws 11 and 12. This rod extends downward to slide thru the bracket 47 which is also clamped to the wire at 48 and to the outer end of this bracket is fixed an insulated rod 49 which is notched along its edge as at 50, see Figure 2, and projects upwardly to slide through the bracket 46.

The specimen is elongated between the points 46 and 47 as the pull or strain is applied to the specimen and in order to indicate this stretch or elongation of the specimen during this test, I have coated the rod 49 with insulation material and have removed the insulation at intervals along its inner edge as at 50. A spring contact member 51 is mounted on the upper clamp 46 in such a way as to successively snap into these recesses 50 into contact with the conducting core and so complete the electric circuit therethrough to transmit impulses to the needle 33 to indicate on the chart as above described.

In some instances instead of providing an insulated rod 49 I may, in some instances, in order to bring the impulses more closely together multiply the number of electrical contact points within a given length of stretch of the specimen which is particularly desirable where a relatively small stretch is to be recorded such as occurs on some of the hard metals; and to accomplish this in a simple and practical way, I provide a rack 52 which is clamped at its upper end at 53 to the specimen 10, which rack extends down through a guide 54, clamped at 55 to the specimen. On this lower guide, I have mounted a pinion 56 engaging the rack, which pinion carries a contact wheel 57 having a multiplicity of contacts 58 about its periphery arranged, as the disc 57 revolves, to engage the contact pin 59 to which the circuit wires are connected, whereby at each contact of the wheel and the pin 59 an impulse is imparted to the pointer 33 on the recording device.

In still other cases, as illustrated in Figure 5, instead of using a rack and pinion, I may wind a coil of wire 60 about a core of insulation material 61, which core is supported on the upper bracket 62 and the spring contact 63 on the lower bracket 64, so that as the upper and lower brackets separate due to the stretch of the specimen, this contact engages these coils step by step and transmits the impulse to the chart.

In testing a rubber standard sample 65, as best illustrated in Figure 8, the sample is usually prepared of dumb-bell shape having a middle reduced portion with spaced marks as at 66 thereon, upon which the stretch is to be indicated. This sample is then connected between the upper and lower clamp jaws 67 and 68, respectively.

Before the test, this sample is carefully calibrated and if it is of the standard size of one-quarter inch in width by exactly one-tenth inch in thickness the standard weight 69 on the swinging arm 70 is employed but if the thickness should be greater than the standard weight it may be slid downwardly on the graduated arm to compensate for this change in dimensions of the specimen or another or auxiliary weight 71 may be added for each 1/5000 increase in the thickness of the sample so that if the sample is thicker than the standard the required additional weight to compensate for this difference will be applied. If preferred, an auxiliary weight may also be applied to the construction illustrated in Figure 1, or any other desired means may be employed to compensate for specimens of different dimensions so that the machine will read in terms of standard sizes.

The power applying mechanism is now started, usually through an electric motor (not shown). A pair of trammel points 72 and 73 are supported in position along the sides of the sample being tested. These points are moved over a graduated scale 74, the upper trammel 72 being moved downwardly slowly by hand, to follow the upper mark 66 on the work to compensate for the stretch of the upper portion thereof and the downwardly yielding movement of the upper clamp jaw, while the lower trammel point 73 is moved downwardly over the scale following the lower mark 66 to indicate the stretch of the sample.

At each 100 percent elongation of the sample or other unit of measure, as indicated by these trammel points, the operator may press the foot switch 75 and close the circuit thus causing the spark to jump through the paper and puncture the chart at these different intervals of stretch and also again at the point of breaking as above described. After this sample has been broken the mechanism is returned to starting position, another sample is positioned between the clamps 72 and 73, the dial pointer is automatically moved back to its starting position when the weight arm 70 is released to swing back to zero, the platen with its chart is moved upwardly one line, and the testing operation above described is repeated with each sample tested.

After the test is completed the chart is removed from the platen, turned over with its front side outward then the different points in each row of punctures are projected progressively across to the corresponding percentage line on the chart and the curve for each of the different samples is drawn through its plotted points, which curve represents the pounds pull per square inch of each one hundred percent elongation of the sample, which result is accurately obtained without further mathematical calculations thus saving much time and eliminating mistakes that might occur in making such calculations.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a testing machine, a tensile testing mechanism, a stretch testing mechanism, an electric circuit, a chart support in said circuit and means responsive to movement of said stretch testing mechanism for closing the circuit intermittently to cause a spark to jump through the chart at intervals to the support beyond.

2. In a testing machine, a tensile testing mechanism, a stretch testing mechanism, an electric circuit, a chart support in said circuit and means responsive to movement of said stretch testing mechanism for closing the circuit intermittently and automatically to cause a spark to jump through the chart at intervals to the support beyond.

3. In a testing machine, a tensile testing mechanism, a cooperating stretch recording mechanism including an electric circuit and means responsive to increments of stretch for closing the circuit intermittently to record corresponding electrical impulses on a chart, an indicator for showing the strain applied in the tensile test and means for varying the reading of the indicator to compensate for the varying pull on test specimens of different dimensions so as to read in terms of a specimen of standard dimensions.

4. In a testing machine, a tensile testing mechanism, a stretch testing mechanism, an electric circuit, recording mechanism in said circuit, and means responsive to increments of stretch for causing electrical impulses in said recording mechanism to record the stretch on a chart, an indicator for showing the strain applied in the tensile test and means for varying the reading of the indicator to compensate for the pull on test specimens of different dimensions so as to read in terms of a specimen of standard dimensions.

5. In a testing machine, a tensile testing mechanism, a stretch testing mechanism, an electric circuit, a chart support in said circuit, a spark device in said circuit movable in response to changes in tension, and means for closing the circuit intermittently to cause a spark to jump from the spark device through the chart at intervals to the support beyond, an indicator for showing the strain applied in the tensile test and means for varying the reading of the indicator to compensate for the pull on test specimens of different dimensions and to read in terms of a specimen of standard dimensions.

6. In a testing machine, a tensile testing mechanism, a stretch testing mechanism, an electric circuit, a chart support in said circuit, a spark device in said circuit movable in response to changes in tension, and means for closing the circuit intermittently and automatically to cause a spark from the spark device to jump through the chart at intervals to the support beyond, an indicator for showing the strain applied in the tensile test and means for varying the reading of the indicator to compensate for the pull on test specimens of different dimensions and to read in terms of a specimen of standard dimensions.

7. In a testing machine for elongatable material, means for stretching the specimen, means for measuring the tension on the specimen, an electric circuit, spaced conductors forming a spark gap, a chart in said gap, means operating by said measuring means to vary the positons of said gap conductors relative to the chart, and means for controlling the electric circuit to cause a spark to jump said gap and pierce said chart at a predetermined point of stretch of said sample.

8. In a testing machine, means including a tension resisting mechanism for progressively applying a testing strain to a specimen being tested, means for measuring the resulting elongations, means for measuring the pounds pull on the sample in combination with a chart carrying platen, a chart on the platen, an electric circuit, a sparking point in said circuit, means moving said sparking point along the surface of the chart in response to movement of said tension resisting mechanism, and means for closing the circuit at intervals corresponding to predetermined increments of elongation to cause a spark to jump from said point through the chart to indicate on the reverse side as the point is moved along its surface.

9. In a testing machine, means including a tension resisting mechanism for progressively applying a testing strain on the specimen being tested, means for measuring the pull on specimen, in combination with a chart-carrying platen, a chart on the platen, an electric circuit, a sparking point in said circuit, means moving said sparking point along the surface of the chart by the tension resisting mechanism, and means by which the circuit may be closed at intervals corresponding to predetermined increments of elongation to cause a spark to jump from said point through the chart to indicate on the reverse side thereof as the point is moved along its surface, and means for varying the resistance to the pull on the upper work gripping jaw.

10. In a testing machine, means for progressively applying a testing strain to the specimen being tested for measuring its elongation, means including a compensating weight arm and a graduated dial for measuring the pounds pull on the specimen, a chart-carrying platen, an electric circuit, an insulated sparking point mounted to be moved along the face of the chart mounted on the platen, an insulated connector between said point and weight arm for advancing said point upon movement of said weight arm, and a switch for closing the circuit at desired intervals to cause a spark to jump and burn through the chart supported on the platen.

11. In a testing machine, means for progressively applying a testing strain to the specimen being tested, means for measuring the elongation of the specimen, means including a compensation weight arm and a graduated dial for measuring the pounds pull on the specimen, a chart-carrying platen, an electric circuit, an insulated sparking point mounted to be moved along the face of the chart mounted on the platen, an insulated connection between said point and weight arm through which said point is advanced upon movement of said weight arm, a switch for advancing said point, a switch for closing the circuit at desired intervals to cause a spark to jump through and pierce the chart carried by the platen, and means whereby the weight of said compensating arm may be varied to compensate for the pull on test specimens of different dimensions to read in terms of a standard specimen.

In testimony whereof I affix my signature.

ROBERT P. STEVENSON.